US008360531B2

(12) United States Patent
Gales

(10) Patent No.: US 8,360,531 B2
(45) Date of Patent: Jan. 29, 2013

(54) HYDRAULIC BRAKE SYSTEM

(75) Inventor: Nicolas Gales, Pontchateau (FR)

(73) Assignee: Clark Equipment Company, West Fargo, ND (US)

(*) Notice: Subject to any disclaimer, the term of this patent is extended or adjusted under 35 U.S.C. 154(b) by 839 days.

(21) Appl. No.: 12/269,211

(22) Filed: Nov. 12, 2008

(65) Prior Publication Data

US 2009/0121540 A1 May 14, 2009

Related U.S. Application Data

(60) Provisional application No. 60/987,436, filed on Nov. 13, 2007, provisional application No. 61/092,910, filed on Aug. 29, 2008.

(51) Int. Cl.
*F15B 11/00* (2006.01)

(52) U.S. Cl. ........................................ 303/10; 91/516

(58) Field of Classification Search ................ 303/3, 10; 180/417, 442; 91/516

See application file for complete search history.

(56) References Cited

U.S. PATENT DOCUMENTS

| | | | | |
|---|---|---|---|---|
| 3,937,243 A | | 2/1976 | Harkrader et al. | 137/115 |
| 4,034,563 A | | 7/1977 | Orth | 60/422 |
| 4,070,858 A | | 1/1978 | Hand | 60/422 |
| 4,074,528 A | | 2/1978 | Lourigan et al. | 60/422 |
| 4,075,840 A | | 2/1978 | Jesswein | 60/422 |
| 4,116,001 A | | 9/1978 | Orth | 60/420 |
| 4,463,558 A | | 8/1984 | Miller et al. | 60/422 |
| 4,470,259 A | | 9/1984 | Miller et al. | 60/422 |
| 4,470,260 A | | 9/1984 | Miller et al. | 60/422 |
| 4,645,026 A | | 2/1987 | Adams | 180/132 |
| 4,966,066 A | * | 10/1990 | Kauss et al. | 91/516 |
| 5,165,233 A | * | 11/1992 | Betz | 60/488 |
| 5,179,835 A | * | 1/1993 | Casey et al. | 60/386 |
| 5,377,717 A | * | 1/1995 | Toogood et al. | 137/101 |
| 2002/0180258 A1 | | 12/2002 | Davison | 303/10 |
| 2005/0205337 A1 | * | 9/2005 | Porskrog et al. | 180/417 |

FOREIGN PATENT DOCUMENTS

| | | |
|---|---|---|
| DE | 35 28 067 | 2/1987 |
| EP | 1 160 140 | 12/2001 |

OTHER PUBLICATIONS

International Search Report.

Communication dated Apr. 27, 2012 in Chinese application No. 200880115881.4, filed Nov. 12, 2008, with English translation attached, 19 pages.

* cited by examiner

*Primary Examiner* — Robert A Siconolfi
*Assistant Examiner* — Stephen Bowes
(74) *Attorney, Agent, or Firm* — John D. Veldhuis-Kroeze; Westman, Champlin & Kelly, P.A.

(57) ABSTRACT

Embodiments of a hydraulic brake system are disclosed. In one embodiment, a priority flow control valve for supplying operating pressure has a first orientation in which operating pressure is provided at a controlled flow port and a second orientation in which operating pressure is provided at the controlled flow port and an excess flow port. A steering control unit has an inlet port for receiving operating pressure and an outlet port for communicating a steering control load sense signal. A brake control unit has an inlet port for receiving operating pressure and an outlet port for communicating a braking control load sense signal. The inlet port of the brake control unit and the inlet port of the steering control unit are connected to the controlled flow port.

8 Claims, 3 Drawing Sheets

318
319
CF
EF
T1
323
313
D
T
LS
317
312
310
IN
GEAR PUMP WITH
STEERING PRIORITY
FLOW CONTROL VALVE
T2
324
322
CHECK VALVE
340
STEERING CONTROL UNIT
L
R
22
314
R
311
335
348
ACCUMULATOR
333
338
330
A
MA
349
P
S
315
331
332
ACCUMULATOR
CHARGING VALVE
PARKING BRAKE
SPRING APPLIED
PRESSURE RELEASE
326
316
328
334
SERVICE BRAKE-
PRESSURE APPLIED
F
P
327
335
300

FRONT AXLE
26
30
304
P2
P1
28
304

HYDRAULIC BRAKE SYSTEM

BACKGROUND

The present invention relates to a hydraulic brake system for a construction vehicle. One particular embodiment pertains to a system configuration having a high pressure brake circuit supply.

Currently, there are a variety of different schemes for powering the service brake of a construction vehicle. For example, it is common for certain vehicles, such telescopic material handlers, to use charge pressure, master cylinders or priority flow control valves to supply the service brake. Systems that utilize a master cylinder design commonly have a volume limitation. This can have negative implications. For example, the brake pedal may have to be "pumped" in order to generate full pressure at the service brake. Systems that utilize a priority flow control scheme are often relatively complicated due to the additional control valve and additional plumbing. Systems that utilize charge pressure to supply the service brake are typically limited to the pressure in the charge system. If the charge pressure is low, the braking capability of the machine will be limited.

SUMMARY

In one embodiment, the present invention provides an improved hydraulic brake system including a priority flow control valve for supplying operating pressure. The priority flow control valve has a first orientation in which operating pressure is provided at a controlled flow port and a second orientation in which operating pressure is provided at the controlled flow port and an excess flow port. A steering control unit has an inlet port for receiving operating pressure and an outlet port for communicating a steering control load sense signal. A brake control unit has an inlet port for receiving operating pressure and an outlet port for communicating a braking control load sense signal. The inlet port of the brake control unit and the inlet port of the steering control unit are connected to the controlled flow port.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
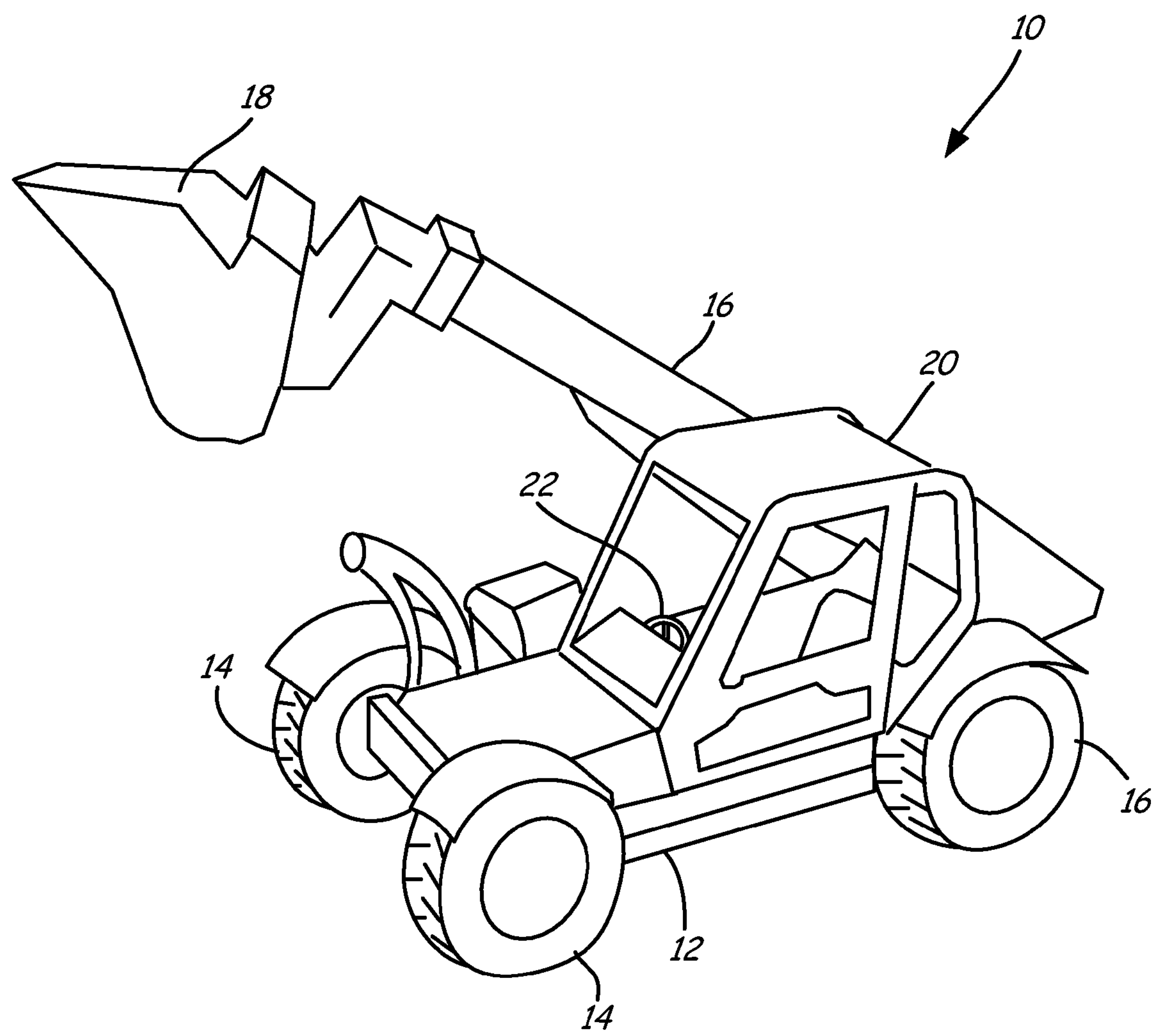
FIG. 1 is a perspective view of a construction vehicle for use with an embodiment of the invention.

FIG. 1 illustrates a construction vehicle 10 for use with embodiments of the invention. The construction vehicle 10 is a telescopic material handler. However, in other embodiments, the construction vehicle 10 can be a loader or other type of work machine. The construction vehicle 10 includes a frame 12 supported for movement over the ground by a pair of front wheels 14 and a pair of rear wheels 16. A work arm 18 is pivotally mounted to the frame 12 and can include an implement 18 attached to a distal end thereof. An operator compartment 20 is supported on the frame 12 and includes an operator control 22 for controlling steering functions (i.e., a steering angle of the front wheels 14). In the illustrated embodiment, the operator control 22 is a steering wheel. In other embodiments, the operator control 22 can be a joystick. A prime mover (not shown) is supported on the frame 12 for driving movement of the wheels 14, 16 and for powering the work arm 18 and other systems. The prime mover can be an internal combustion engine, a hydraulic engine or other type of suitable power supply.

Figure 2:
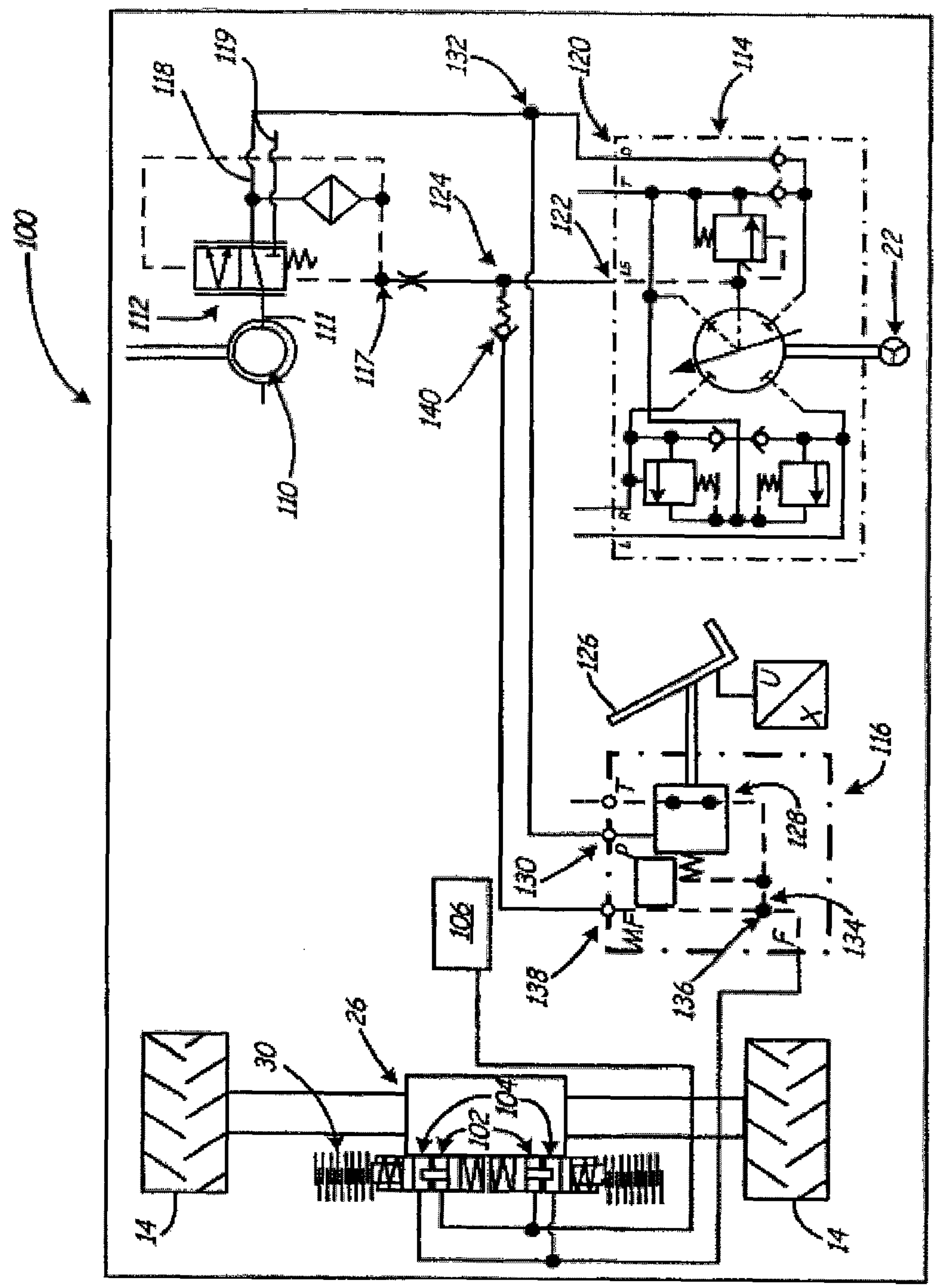
FIG. 2 schematically illustrates a hydraulic brake system according to an embodiment of the present invention.

FIG. 2 schematically illustrates a hydraulic brake system 100 for use with the construction vehicle 10 according to an embodiment of the invention. The brake system 100 is operable to slow rotation of the front wheels 14, which are connected by a front axle 26. A plurality of left brake discs 28 and a plurality of right brake discs 30 are coupled to the rotors (not shown) of the left and right wheels front 14, respectively. Compressing the brake discs 28, 30 against the rotors rotation of the wheels 14.

A first or inner of pistons 102 and second or outer pair of pistons 104 are provided for actuating the brake discs 28, 30. The inner pistons 102 are connected to a parking brake control 106. The brake discs are normally compressed with springs (spring applied brakes) when the parking brake is released. Actuating the parking brake control moves the inner piston 102 under the influence of hydraulic pressure to release the brake discs. The parking brake control is released when the vehicle is operating, so the brake discs are released. The outer pistons 104 are moved outwardly under hydraulic pressure to compress the brake discs independently of pistons 102, when a service brake is actuated. As the outer pistons 104 move outwardly, the corresponding brake discs 28, 30 are compressed against the rotors, slowing the rotation of the wheels 14.

The brake system 100 includes a hydraulic pump 110 connected to a fluid reservoir (not shown). An outlet 111 of the pump 110 provides pressurized flow to a priority flow control valve 112. The priority flow control valve 112 supplies pressure from the pump 110 to a steering control unit 114 and to a service brake unit 116. The priority flow control valve 112 has an input load sense port 117 for receiving a load sense signal. The load sense signal determines the flow of fluid through the priority flow control valve 112. In a first orientation determined by the load sense signal, the priority flow control valve 112 supplies pressure from the pump 110 to a controlled flow port 118. In a second orientation determined by the load sense signal, the priority flow control valve 112 supplies pressure from the pump 110 to an excess flow port 119 in addition to the controlled flow port 118.

Flow from the controlled flow port 118 passes through a T type connection 132 so as to route to a service brake valve inlet port 130 as well as a steering control unit inlet port 120.

The excess flow port 119 can be connected to secondary or auxiliary systems in which the need for fluid pressure is lower priority than for steering and braking. FIG. 2 shows the priority flow control valve 112 in the first orientation, i.e., supplying pressure only to the controlled flow port 118.

The controlled flow port 118 on the priority flow control unit 112 supplies pressure to an inlet port 120 of the steering control unit 114. When the steering control unit 114 is actuated (for example, by turning the operator input 22), the steering control unit 114 routes operating pressure to steering control cylinders, thereby controlling the steering angle of the front wheels 14. In addition, the steering control unit 114 generates a steering load sense signal at an outlet port 122. The steering load sense port 122 is connected to the load sense port 117 through a T-type connection 124.

The controlled flow port 118 on the priority flow control unit 112 supplies pressure to an inlet port 130 of the service brake valve 128. The service brake unit 116 includes an operator braking input 126 connected to a service brake valve 128. In the illustrated embodiment, the operator braking input 126 is a foot pedal. When the service brake unit 116 is actuated (for example, by depressing the operator braking input 126), the service brake valve 128 routes operating pressure to a brake valve output 134. A T-type connection 136 connects the brake valve output 134 to the outer pair of pistons 104. The hydraulic pressure provided to the outer pistons 104 by the service brake unit 116 moves the outer pistons 104 outwardly towards the brake discs 28, 30, compressing the brake discs 28, 30.

When the service brake unit 116 is actuated, a portion of the brake valve output 134 is routed to a brake load sense port 138 through the connection 136. The brake load sense signal at the brake load sense port 138 is connected to the steering load sense signal from the steering load sense port 122 at the connection 124. Therefore, the brake load sense signal and the steering load sense signal, alone or in combination, provide a load sense signal to the priority flow control valve 112 when their respective systems are actuated. Thus, when either the service brake unit 116 or the steering control unit 114 is actuated, the priority flow control valve 112 is oriented to the first orientation, thereby providing priority flow to these systems.

A check valve 140 between the brake load sense port 138 and the connection 124 prevents load sense pressure from the steering control unit 114 from draining out the tank port of the service brake valve 124 when the operator braking input 126 is not being actuated.

The brake system 100 provides high pressure to the service brake inlet port 130 using the priority flow control from the steering control unit 114. This is accomplished by connecting the service brake inlet port 130 to the controlled flow port 118, which is also connected to the steering control inlet port 120.

Figure 3:
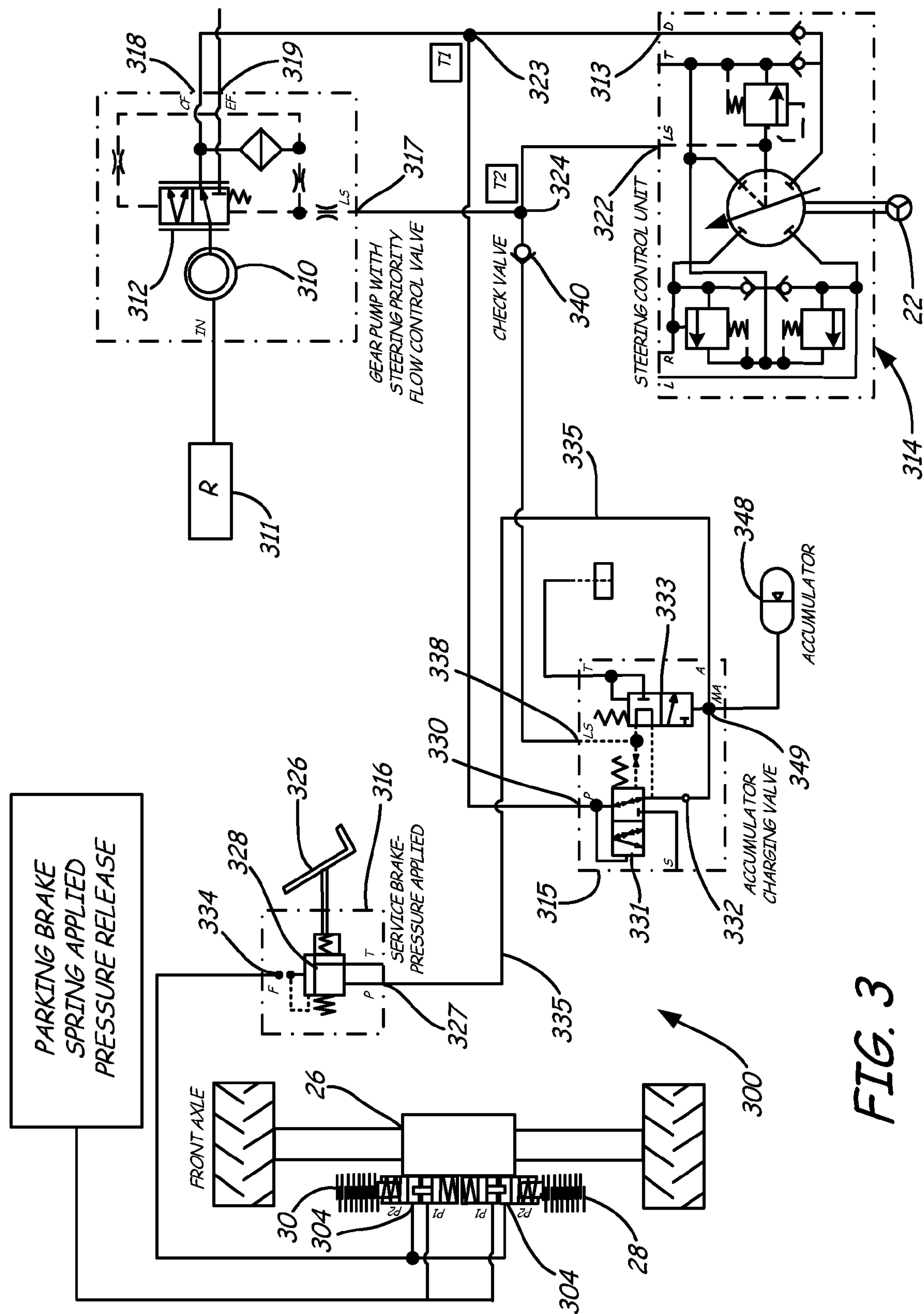
FIG. 3 schematically illustrates a hydraulic brake system according to another embodiment of the present invention.

FIG. 3 illustrates a brake system 300 according to another embodiment of the disclosure. The brake system 300 utilizes pressure developed by a pump that is used for steering the vehicle, as is the embodiment of FIG. 2. It also includes an accumulator to store energy for the service brake system, which is available for use in case of a reduction in pressure from the pump.

In FIG. 3, hydraulic gear pump 310 is incorporated into a unit with a steering priority flow control valve assembly 312. The gear pump 310 has an input line connected to a reservoir or tank 311, and provides pressurized flow to the steering priority flow control valve 312. The priority flow control valve 312 when in the position shown schematically in FIG. 3, provides pressure from the pump 310 to controlled flow port 318 and then to a port 313 of a steering control unit 314, which is used for steering control of the vehicle. In a second state of the priority flow control valve 312, flow is provided to an excess flow port 319, as explained in relation to FIG. 2.

The fluid under pressure from port 318 is also supplied to an accumulator charging valve 315 through a T-connection 323, and then to a service brake actuator 316. The priority flow control valve 312 has a load sensing port 317 that senses load or pressure at a load sense port 322, that is developed by operating the steering control operator input 22. The accumulator charge circuit also has a load sense port 338 that also is connected by a line to the load sensing port 317 of valve 312 through a check valve 340, and a T-connection 324 that also is connected to port 322. The pressure signal at port 317 controls the amount of output flow at port 318. The flow from controlled flow port 318 is provided to an inlet port 313 of the steering control unit, and to an inlet port 330 of the accumulator charging valve 315 through the T-connection 323.

When the gear pump 310 is energized, the accumulator 348 will start to charge (pressure in the accumulator rises) by the fluid under pressure pressure from port 318, through T-connection 323, port 330 and first spool 331 of the accumulator charging valve 315 and also through the check valve 332 to the accumulator 348. The pump pressure at the port 330 is also in communication with the load sense port 317 of the steering priority control flow valve 312 through the load sense port 338 and a load sense line. The pressure at port 338 is provided from port 330 through the spools of valves 331 and 333 of the accumulator charging valve 315. The steering priority valve 312 continues to provide fluid under pressure from pump 310 through port 318 to the accumulator 348 until the accumulator reaches its upper pressure setting, which is determined by the setting of the valve 333. Valve 333 acts as a relief valve, and when the pressure in the accumulator reaches its set value, the value 333 will shift connecting the load sensing port 338 to tank as shown, so the load sense pressure signal at port 338 disappears. The shifting of valve 333 stops the charging of the accumulator since the load sensing port 317 is not in communication with a pressure signal.

The check valve 332 prevents pressure from the accumulator 348 from feeding back through spool valve 331 and port 330. The pressure in the accumulator 348 is thus available on line 335 connected to the inlet port 327 of the service brake valve 328 of the service brake unit 316. If the brake valve 328 is actuated by moving the operator input pedal 326, the accumulator pressure on line 335 is provided to the output port 334 of service brake valve 328 and to pistons 304 for compressing brake discs 28, 30, and the service brakes are applied. As pressure in the accumulator drops, the valve 333 will shift to its solid line position shown in FIG. 3, and the load sense port 338 will send a pressure signal to load sense port 317 of the steering priority flow control valve, and fluid under pressure will again be provided through port 318 to the accumulator charging valve 315, to re-charge the accumulator 348 and/or to be provided along line 335 to directly operate the brakes.

It should be noted that the brake discs are spring compressed for a parking brake, and are pressure released by a separate control when the vehicle 10 is operated.

It is also noted that the check valve 340 between the port 338 and the T-connection 324 prevents the load sense signal from the steering control unit 314, which is provided to the load sense port 317 when the vehicle is steered, from discharging into the accumulator charging valve and valve 333 in its shifted (relief) position and then to the tank.

The use of the accumulator 348 in the service brake system ensures that the pressure will be available for braking the vehicle if pressure from the pump 310 is lost, because the charged accumulator 348 will not discharge until used by the brake service unit 316. The check valve 332 prevents back flow from the accumulator. The fluid under pressure will remain on line 335 and usable for the brakes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hydraulic brake system, comprising:

a priority flow control valve for supplying operating pressure, the priority flow control valve having a first orientation in which operation pressure is provided at a controlled flow port and a second orientation in which operating pressure is provided at the controlled flow port and an excess flow port;

a steering control unit, the steering control unit having an inlet port for receiving operating pressure and an outlet port for communicating a steering control load sense signal;

a brake control unit, the brake control unit having an inlet port for receiving operating pressure and an outlet port for communicating a braking control load sense signal; and wherein the inlet port of the brake control unit and the inlet port of the steering control unit are connected to the controlled flow port such that fluid from the steering control load sense signal and the braking control load sense signal are combined and simultaneously provided to the priority flow control valve.

2. The hydraulic brake system of claim 1, wherein the inlet port of the brake control unit and the inlet port of the steering control unit are connected to one another and to the controlled flow port.

3. The hydraulic brake system of claim 1, wherein the orientation of the priority flow control valve is determined by a load sense signal.

4. The hydraulic brake system of claim 1, wherein the priority flow control valve is configured to provide operating pressure to the controlled flow port in each of its orientations.

5. A hydraulic brake system, comprising:

a hydraulic pump;

a priority flow control valve connected to an outlet of the hydraulic pump for supplying an operating pressure, the priority flow control valve having a first orientation in which operating pressure is provided at a controlled flow port and a second orientation in which operation pressure is provided at the controlled flow port and an excess flow port;

a steering control unit, the steering control unit having an inlet port for receiving the operating pressure and an outlet port for communicating a steering control load sense signal;

a brake control unit having an inlet port for receiving the operating pressure, the brake control unit also having a first outlet port and a second outlet port, the second outlet port communicating a braking control load sense signal, wherein the inlet port of the brake control unit and the inlet port of the steering control unit are connected to the controlled flow port; and at least a first braking piston connected to the braking control unit first outlet port, the braking piston operable under the influence of the brake control unit to exerting a braking force; and wherein the steering control load sense signal and the braking control load sense signal are simultaneously and collectively provided to the priority flow control valve.

6. The hydraulic brake system of claim 5, wherein the inlet port of the brake control unit and the inlet port of the steering control unit are connected to one another and to the controlled flow port.

7. The hydraulic brake system of claim 5, wherein the orientation of the priority flow control valve is determined by a load sense signal.

8. The hydraulic brake system of claim 5, wherein the load sense signal includes one or both of the steering control load sense signal and the braking control load sense signal.

* * * * *